US011237564B2

(12) United States Patent
Wilkinson

(10) Patent No.: US 11,237,564 B2
(45) Date of Patent: Feb. 1, 2022

(54) MOTION PLANNING SYSTEM OF AN AUTONOMOUS VEHICLE

(71) Applicant: UATC, LLC, San Francisco, CA (US)

(72) Inventor: Eric Lloyd Wilkinson, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 635 days.

(21) Appl. No.: 16/122,520

(22) Filed: Sep. 5, 2018

(65) Prior Publication Data

US 2020/0064851 A1    Feb. 27, 2020

Related U.S. Application Data

(60) Provisional application No. 62/721,739, filed on Aug. 23, 2018.

(51) Int. Cl.
*G05D 1/02* (2020.01)
*G05D 1/00* (2006.01)
*B60W 30/095* (2012.01)
*B60W 30/09* (2012.01)
*G06K 9/00* (2006.01)

(52) U.S. Cl.
CPC .......... *G05D 1/0221* (2013.01); *B60W 30/09* (2013.01); *B60W 30/0956* (2013.01); *G05D 1/0088* (2013.01); *G05D 1/0238* (2013.01); *G06K 9/00805* (2013.01); *G05D 2201/0213* (2013.01)

(58) Field of Classification Search
CPC .............. B60W 30/095; B60W 30/09; B60W 30/0956; G05D 1/0221; G05D 1/0088
See application file for complete search history.

(56) References Cited

U.S. PATENT DOCUMENTS

| 2017/0277194 A1* | 9/2017 | Frazzoli ............ B60W 60/0015 |
| 2018/0079420 A1* | 3/2018 | Aine ..................... B60W 10/20 |
| 2018/0150080 A1* | 5/2018 | Gross .................. G05D 1/0088 |
| 2018/0150081 A1* | 5/2018 | Gross .................... G06N 5/045 |

* cited by examiner

*Primary Examiner* — Thomas G Black
*Assistant Examiner* — Tarek Elarabi
(74) *Attorney, Agent, or Firm* — Dority & Manning, P.A.

(57) ABSTRACT

Generally, the present disclosure is directed to systems and methods that include or otherwise leverage a decision point engine as part of determining a motion plan for an autonomous vehicle. In particular, a motion planning system that includes a decision point engine can be configured to obtain object data associated with one or more objects identified near one or more travel paths of an autonomous vehicle. The system can determine a stopping profile based at least in part on the object data, wherein the stopping profile identifies a set of candidate states for the autonomous vehicle that preserves an ability of the autonomous vehicle to stop before the interaction point. The system can determine a decision point corresponding to a selected state from the set of candidate states identified by the stopping profile, and determine a trajectory for the autonomous vehicle based at least in part on the decision point.

18 Claims, 7 Drawing Sheets

MOTION PLANNING SYSTEM OF AN AUTONOMOUS VEHICLE

PRIORITY CLAIM

The present application is based on and claims benefit of U.S. Provisional Application 62/721,739 having a filing date of Aug. 23, 2018, which is incorporated by reference herein.

FIELD

The present disclosure relates generally to autonomous vehicles. More particularly, the present disclosure relates to autonomous vehicles that feature a motion planning system with a decision point engine.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system for autonomous vehicle control. The computing system includes one or more processors and one or more non-transitory computer-readable media that collectively store instructions that, when executed by the one or more processors, cause the computing system to perform operations. The operations include obtaining object data associated with an object identified near one or more travel paths of an autonomous vehicle. The object data comprises at least a probability of interaction between the autonomous vehicle and the object at an interaction point. The operations also include determining a stopping profile based at least in part on the object data, wherein the stopping profile identifies a set of candidate states for the autonomous vehicle that preserves an ability of the autonomous vehicle to stop before the interaction point. The operations also include determining a decision point corresponding to a selected state from the set of candidate states identified by the stopping profile. The operations also include determining a trajectory for the autonomous vehicle based at least in part on the decision point. The operations also include controlling motion of the autonomous vehicle based at least in part on the trajectory.

Another example aspect of the present disclosure is directed to a computer-implemented method. The method includes obtaining, by a computing system comprising one or more computing devices, object data associated with one or more objects identified near one or more travel paths of an autonomous vehicle. The object data comprises at least a probability of interaction between the autonomous vehicle and at least one of the objects at an interaction point. The method also includes determining, by the computing system, a stopping profile based at least in part on the object data, wherein the stopping profile identifies a set of candidate states for the autonomous vehicle that preserves an ability of the autonomous vehicle to stop before the interaction point. The method also includes determining, by the computing system, a decision point corresponding to a selected state from the set of candidate states identified by the stopping profile, wherein the decision point is determined based on where the stopping profile intersects with a linear representation of the estimated arrival time of the autonomous vehicle at the interaction point. The method also includes determining, by the computing system, a trajectory for the autonomous vehicle based at least in part on the decision point. The method also includes controlling, by the computing system, motion of the autonomous vehicle based at least in part on the trajectory.

Another example aspect of the present disclosure is directed to an autonomous vehicle that includes one or more processors and one or more non-transitory computer-readable media that collectively store instructions that, when executed by the one or more processors, cause the one or more processors to perform operations. The operations include obtaining object data associated with one or more objects identified near one or more travel paths of an autonomous vehicle. The object data comprises at least a probability of interaction between the autonomous vehicle and at least one of the one or more objects at an interaction point. The operations also include determining a stopping profile based at least in part on the object data, wherein the stopping profile identifies a set of candidate states for the autonomous vehicle that preserves an ability of the autonomous vehicle to stop before the interaction point. The operations also include determining a decision point corresponding to a selected state from the set of candidate states identified by the stopping profile. The operations also include generating a speed zone constraint based on the stopping profile and the decision point that defines an area within a multi-dimensional space that limits travel speed of the autonomous vehicle. The operations also include determining an optimum speed profile from a plurality of speed profiles for implementation by the autonomous vehicle, wherein each of the plurality of speed profiles is determined to satisfy the speed zone constraint and a plurality of other constraints associated with travel by the autonomous vehicle. The operations also include determining a trajectory based on the optimum speed profile for implementation by the autonomous vehicle. The operations also include controlling motion of the autonomous vehicle based at least in part on the trajectory.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
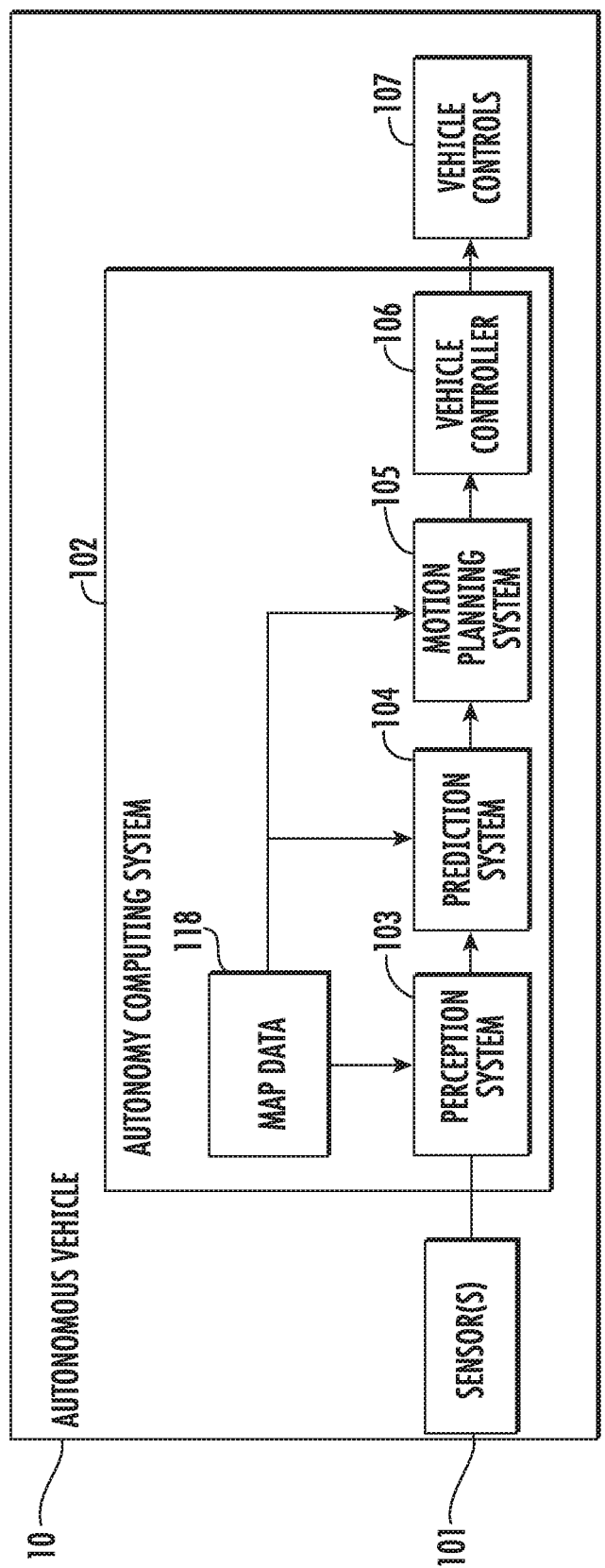
FIG. 1 depicts a block diagram of an example autonomous vehicle according to example embodiments of the present disclosure.

Generally, the present disclosure is directed to systems and methods that include or otherwise leverage a decision point engine within a motion planning system to determine a trajectory for an autonomous vehicle (AV). For example, a motion planning system can leverage object data associated with an object identified near one or more travel paths of an autonomous vehicle. The object data can be used to determine a stopping profile that identifies a set of candidate states for the AV that preserves the AV's ability to stop before an interaction point. A decision point corresponding to a selected state from the set of candidate states can then be used to help determine a trajectory that complies with vehicle speed zone constraints defined relative to the decision point. A decision point engine configured to operate in accordance with such features can provide an AV motion planning system that dynamically incorporates speed reduction relative to objects having a generally lower probability of interaction with the AV. As such, an autonomous vehicle can be configured to operate in a manner with more advantageously preserved braking/stopping opportunities and an overall increase in safety for the vehicle, cargo and/or passengers.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.). The autonomous vehicle can include an autonomy computing system that assists in controlling the autonomous vehicle. In some implementations, the autonomy computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of objects within the surrounding environment of the autonomous vehicle. For example, the objects can include traffic signals, additional vehicles, pedestrians, bicyclists, and/or other objects. The sensor data can include raw sensor data and/or data that has been processed or manipulated in some manner before being provided to other systems within the autonomy computing system.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop sign or yield sign), traffic lights (e.g., stop light), or other traffic signals or control devices/markings (e.g., cross walks)); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for one or more of the objects, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system. In some implementations, predictions are provided only for objects of certain class(es).

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations. As one example, the motion planning system can include a trajectory generator that generates a planned trajectory for the autonomous vehicle.

As an example, in some implementations, the motion planning system operates to generate a new motion plan for the autonomous vehicle multiple times per second. Each new motion plan can describe motion of the autonomous vehicle over a planning window that spans the next several seconds (e.g., 5 seconds). Thus, in some example implementations, the motion planning system continuously operates to revise or otherwise generate a short-term motion plan based on the currently available data.

According to one example aspect of the disclosed technology, the motion planning system can include a world state generator, a scenario generator, and an optimization planner. The world state generator can receive information from the prediction system, the map data, and/or other information such as vehicle pose, a current route, or other information. The world state generator can synthesize all received information to produce a world state that describes the state of all objects in and other aspects of the surrounding environment of the autonomous vehicle at each time step.

In some implementations, the world state data can include object data for one or more objects, the object data including at least a probability of interaction between the autonomous vehicle and the object at an interaction point. In some implementations, the object data for each object can correspond to an object tuple defining a sequence of variables descriptive of the object. The tuple can include the probability of interaction as well as other variables such as but not limited to an estimated time to interaction, distance to interaction (e.g., distance as defined along one or more travel paths), velocity along track (e.g., longitudinal speed as measured along one or more travel paths), velocity cross track (e.g., lateral speed as measured along one or more travel paths), etc.

With more particular reference to the world state generator, in some implementations, the object data (e.g., an object tuple) can be determined at least in part from travel path data and prediction data. Travel path data can be provided via map data and can be descriptive of the one or more travel paths (e.g., one or more predetermined potential paths for travel of the autonomous vehicle based on a common pattern of vehicle travel along one or more lanes of a roadway). Prediction data can be provided to the world state generator of the motion planning system from the prediction system and can be descriptive of one or more predicted future locations for identified objects proximate to the autonomous vehicle.

The scenario generator can more particularly include a decision point engine, a constraint generator and a constraint solver. The decision point engine can generally be configured to determine when it is appropriate to help preserve an AV's ability to stop without actually requiring the AV to stop. In some implementations, for example, a determination to help preserve the AV's ability to stop can be determined when the probability of interaction between the autonomous vehicle and the object is greater than a predetermined threshold probability value. When preserving an AV's ability to stop is desired, the constraint generator can generate a speed zone constraint that defines an area within a multi-dimensional space that limits travel speed of the autonomous vehicle. The constraint generator can additionally be configured to generate a plurality of other constraints based on where objects of interest are predicted to be relative to an autonomous vehicle. In some implementations, the speed zone constraint and the plurality of other constraints can be respectively defined as a constraint area in a multi-dimensional space (e.g., a path-time (PT) space) that identifies regions along the one or more travel paths that an autonomous vehicle cannot occupy at certain times. The constraint solver within a scenario generator can then identify navigation decisions for each of the constraints that provide a consistent solution across all constraints. The solution provided by the constraint solver can be in the form of a trajectory determined relative to constraint areas for all objects of interest.

With more particular reference to the decision point engine, the decision point engine can be configured to determine a stopping profile based at least in part on the object data obtained from the world state generator. The stopping profile can correspond to a curve that identifies a set of candidate states for the autonomous vehicle that preserves an ability of the autonomous vehicle to stop before the interaction point with an object. In some implementations, the stopping profile can be determined based at least in part on the probability of interaction between the autonomous vehicle and the object at an interaction point. In some implementations, the stopping profile can be determined based on a maximum deceleration value and a maximum jerk value. The maximum deceleration value can be indicative of a maximum level of force applied to a braking actuator associated with the autonomous vehicle, while the maximum jerk value can be indicative of a maximum rate of change for achieving the maximum deceleration value. In some implementations, the maximum deceleration value and maximum jerk value can be determined based on functional limitations associated with the AV's ability to implement a hard brake as fast as possible. In some implementations, the maximum deceleration value and maximum jerk value can be determined in keeping with a more moderate stopping profile (e.g., lower levels than associated with a hard brake) to help maintain greater levels of comfort to potential AV passengers.

In some implementations, the decision point engine can additionally be configured to determine a linear representation of the estimated time of arrival of the autonomous vehicle at the interaction point with an object. In such instances, the linear representation and the stopping profile can be plotted in or otherwise evaluated relative to a similar motion planning space. In some implementations, the decision point can be determined by selecting the state from the set of candidate states along the stopping profile based on where the stopping profile intersects with the linear representation of the estimated time of arrival of the autonomous vehicle at the interaction point.

With more particular reference to the constraint generator, in some implementations, the constraints can be generated relative to one or more objects of interest having a predetermined manner of interaction with the autonomous vehicle and/or one or more performance objectives associated with operation of the autonomous vehicle. Objects of interest, can include, for example, one or more of a vehicle, a pedestrian, a bicycle, a traffic light, a stop sign, a crosswalk, and a speed zone.

In some implementations, constraints can be generated relative to one or more travel paths associated with an autonomous vehicle. A travel path, for example, may correspond to a predetermined potential path for an autonomous vehicle. As an example, in some instances, travel paths can generally correspond to common patterns of vehicle travel along one or more lanes (e.g., lanes on a roadway or other travelway). As one example, a travel path can generally describe a path by which a vehicle or other object may: continue according to its current lane; merge from its current lane into an adjacent lane; turn from the current lane into an adjacent road portion; or other pathways that correspond to other driving actions. In some implementations, travel paths can be defined relative to map data associated with various roadways, road portions or segments, lanes, or the like. For example, travel paths can be defined as a center line or other line parallel or in some predetermined relationship relative to such roadways, road portions or segments, lanes, or the like.

In some implementations, each constraint generated relative to an object of interest and/or performance objective can be defined as a constraint area in multi-dimensional space identifying regions along one or more travel paths that an autonomous vehicle cannot be at certain times. In other words, each candidate maneuver considered by the constraint solver can be configured to represent a path through the multi-dimensional space that does not include the constraint areas. In some examples, the multi-dimensional space (e.g., a path time (PT) space) can include at least a time dimension and a distance dimension relative to travel along the one or more travel paths. Generally, each constraint area can identify regions along the travel path that an autonomous vehicle cannot be at certain times. In some implementations, each constraint area can be defined by one or more of a start time when the constraint begins, a stop time when the constraint ends, a start distance along the travel path when the constraint begins, a stop distance along the travel path when the constraint ends, and/or a maximum velocity that an autonomous vehicle can travel through the constraint area.

In some implementations, constraints can be generated for the time dimension corresponding to a certain time period (e.g. a ten second time period) that includes a plurality of time steps (e.g., one second time intervals or less). In some implementations, constraints are generated based on how objects are classified according to each respective time step. For example, an object can be considered a blocking object during a first time step ($t0$, $t1$) but a non-blocking object during a second time step ($t1$, $t2$). As such, at each time step during a time period, an autonomy computing system can classify an object (e.g., by determining if the object is or is not blocking a lane) and generate a corresponding constraint based on the classification.

In some implementations, the constraint generator can be further configured to generate one or more speed regressors. A speed regressor can be defined as a constraint area within multi-dimensional space in which an AV can travel, but with limitations on AV travel speed. As such, areas can defined within multi-dimensional space that control how fast an AV travels relative to specific areas in space and time (e.g., areas corresponding to other objects, areas corresponding to specific locations on a map, areas associated with a particular maneuver of the AV at a given time, etc.).

With more particular reference to another aspect of the scenario generator, the constraint solver can be configured to employ a rollout method to determine an optimum speed profile from a plurality of candidate speed profiles for implementation by an autonomous vehicle. Each of the plurality of candidate speed profiles can be determined to satisfy a plurality of constraints generated for travel of the autonomous vehicle. Each candidate speed profile can provide a consistent solution across all constraints. A score for each candidate speed profile in the set of candidate speed profiles can be generated, and an optimum speed profile can be determined based at least in part on the scores for each candidate speed profile in the set of candidate speed profiles and on the relative need or preference for each type of candidate speed profile (e.g., the urgency to change lanes now as opposed to staying in a current lane). The score generated for each candidate speed profile can include one or more scoring factors, including but not limited to costs, discounts and/or rewards associated with aspects of a candidate speed profile for use in evaluation of a cost function or other scoring equation. Example scoring factors can include, for example, a dynamics cost for given dynamics (e.g., jerk, acceleration) associated with the candidate speed profile, a buffer cost associated with proximity of a candidate speed profile to one or more constraints within the multi-dimensional space, a constraint violation cost associated with violating one or more constraints, a reward or discount for one or more achieved performance objectives (e.g., distance traveled), a blind spot cost associated with a candidate maneuver that involves spending time in a blind spot of other actors (e.g., other vehicles).

In some implementations, the trajectory determined by the scenario generator is then provided to an optimization planner within a motion planning system to search over a motion planning space to identify a motion plan that optimizes a total cost associated with the motion plan. For example, an optimization planner can be configured to iteratively search over a motion planning space to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner can be or include an iterative linear quadratic regulator or similar iterative solver.

Once the optimization planner has identified the optimal motion plan (or some other iterative break occurs), the optimal motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

The systems, methods, and vehicles described herein may provide a number of technical effects and benefits. By providing a decision point engine configured to determine a trajectory that preserves an AV's ability to stop for certain identified objects, the performance of the motion planning system can be improved. More particularly, known vehicle autonomy systems do not always communicate object probability information about identified objects downstream to a motion planning system for use in trajectory generation. Instead, such autonomy systems used object probability information upstream only to determine whether to pass along object data or not. In accordance with the disclosed techniques, a framework is provided to utilize object probability information and associated analysis in the form of stopping profiles, decision points, and the like to dynamically implement vehicle speed constraints and incorporate rigorous features for preserving safe vehicle operations. As such, a motion planning system is provided that is better able to stop or brake when an object becomes more likely to interact with an AV trajectory. This enhanced ability of a motion planning system to generate safe trajectories effectively reduces likely levels of AV interaction with other objects thus improving motion planning, vehicle safety, and the like.

The systems, methods, and vehicles described herein also provide a framework for determining a set of navigation decisions that are consistent across multiple constraints that can be simultaneously represented within a multi-dimensional space. Because of the unique manner in which multiple constraints can be represented in multi-dimensional space, situations can be avoided whereby a given classifier in a scenario generator could potentially generate a navigation decision that conflicts with a separate classifier. In particular, a framework is provided by which AV behavior relative to objects of interest, fixed locations on a map, and/or speed limitations can all be simultaneously represented in a single computational framework. This allows initial trajectories and/or optimized trajectories to be determined that account for multiple dynamically shifting factors that may arise during AV navigation.

The systems, methods, and vehicles described herein also enable the vehicle computing system to locally (e.g., onboard the vehicle) detect an object, evaluate its features (e.g., speed, location, path) relative to the vehicle and/or the surroundings, and determine a motion plan of the vehicle accordingly. By performing such an operation on-board the autonomous vehicle, the vehicle computing system can avoid the latency issues that arise by communicating with a remote computing system. The vehicle computing system can be configured to continuously perform this iterative optimization process as the vehicle travels and different objects become proximate to the autonomous vehicle. As such, the vehicle computing system can proactively control the motion of the autonomous vehicle to avoid sudden movements that place stress on the vehicle's systems. Moreover, the autonomous vehicle can operate in a manner that is safer for the objects in the vehicle's surroundings.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. For example, the systems and methods of the present disclosure can allow one or more computing devices on-board an autonomous vehicle to determine a scenario and motion plan for the autonomous vehicle that reduce processing cycles in an optimization planner, thus improve processing speed and decision making in an autonomy computing system.

With reference now to the figures, example embodiments of the present disclosure will be discussed in further detail.

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, an autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion plan through such surrounding environment. The autonomy computing system 102 can control the one or more vehicle controls 107 to operate the autonomous vehicle 10 according to the motion plan.

As illustrated in FIG. 1, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 118 that provides detailed information about the surrounding environment of the autonomous vehicle 10. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the autonomy computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 118. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of proximate objects and/or predicted future locations of proximate objects, the motion planning system 105 can determine a motion plan for the autonomous vehicle 10 that best navigates the autonomous vehicle 10 relative to the objects at their current and/or future locations. As one example, the motion planning system 105 can generate a planned trajectory (e.g., a motion plan) for the autonomous vehicle 10.

As an example, in some implementations, the motion planning system 105 operates to generate a new autonomous motion plan for the autonomous vehicle 10 multiple times per second. Each new autonomous motion plan can describe motion of the autonomous vehicle 10 over a planning window that spans the next several seconds (e.g., 5 seconds). Thus, in some example implementations, the motion planning system 105 continuously operates to revise or otherwise generate a short-term motion plan based on the currently available data.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment.

The motion planning system 105 can determine the plurality of features for each vehicle state included in the current candidate motion plan. The motion planning system 105 can determine the plurality of features for each vehicle state included in the candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan (e.g., an optimized trajectory) to a vehicle controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
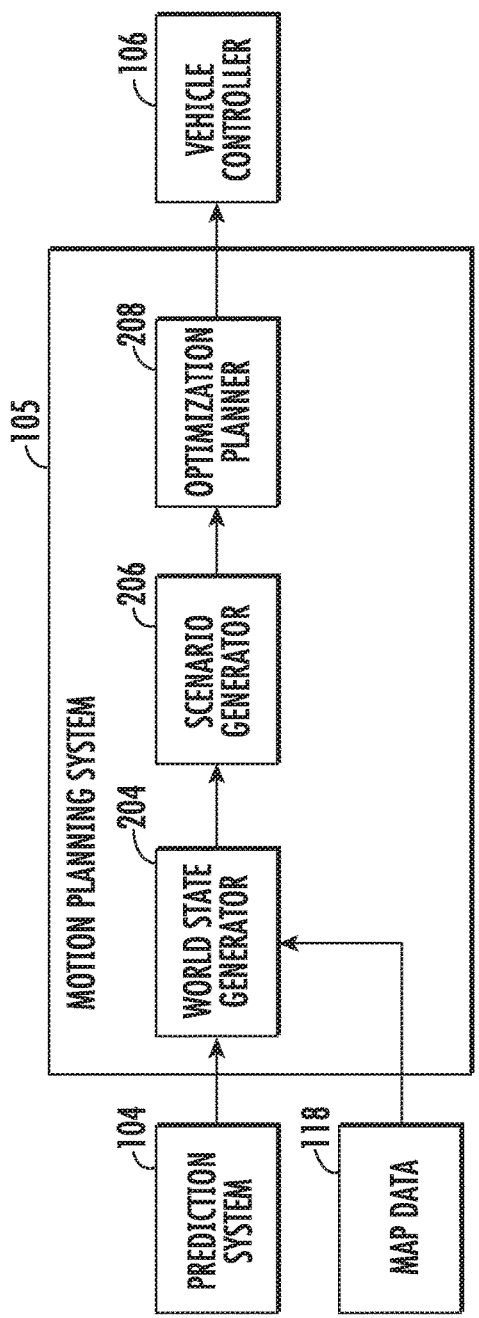
FIG. 2 depicts a block diagram of an example motion planning system according to example embodiments of the present disclosure.

FIG. 2 depicts a block diagram of an example motion planning system 105 according to example embodiments of the present disclosure. The example motion planning system 105 includes a world state generator 204, a scenario generator 206, and an optimization planner 208.

The world state generator 204 can receive information from the prediction system 104, the map data 118, and/or other information such as vehicle pose, a current route, or other information. The world state generator 204 can synthesize all received information to produce world state data that describes the state of all objects in and other aspects of the surrounding environment of the autonomous vehicle (e.g., autonomous vehicle 10) at each time step.

In some implementations, the world state data determined by world state generator 204 can include object data for one or more objects, the object data including at least a probability of interaction between the autonomous vehicle (e.g., autonomous vehicle 10) and the object at an interaction point. In some implementations, the interaction point can correspond to a point at which an object will block an AV from continuing to travel relative to a travel path. In some implementations, the object data for each object can correspond to an object tuple defining a sequence of variables descriptive of the object. The tuple can include the probability of interaction as well as other variables such as but not limited to an estimated time to interaction, distance to interaction (e.g., distance as defined along one or more travel paths), velocity along track (e.g., longitudinal speed as measured along one or more travel paths), velocity cross track (e.g., lateral speed as measured along one or more travel paths), etc.

With more particular reference to the world state generator 204, in some implementations, the object data (e.g., an object tuple) can be determined at least in part from travel path data and prediction data. Travel path data can be provided via map data (e.g., map data 118) and can be descriptive of the one or more travel paths (e.g., one or more predetermined potential paths for travel of the autonomous vehicle 10 based on a common pattern of vehicle travel along one or more lanes of a roadway). Prediction data can be provided to the world state generator 204 of the motion planning system 105 from the prediction system 104 and can be descriptive of one or more predicted future locations for identified objects proximate to the autonomous vehicle 10.

The scenario generator 206 can generate constraints as part of determining a motion plan for an autonomous vehicle (e.g., autonomous vehicle 10). In particular, scenario generator 206 within motion planning system 105 can generate constraints based on where objects of interest are predicted to be relative to an autonomous vehicle, such as indicated by world state generator 204. A constraint solver within scenario generator 206 can identify navigation decisions for each of the constraints that provide a consistent solution across all constraints. The solution provided by the constraint solver can be in the form of a speed profile determined relative to constraint areas for all objects of interest. The speed profile represents a set of navigation decisions such that a navigation decision relative to one constraint doesn't sacrifice an ability to satisfy a different navigation decision relative to one or more other constraints. The set of navigation decisions can then be used by optimization planner 208 within motion planning system 105 to search over a motion planning space to identify a motion plan that optimizes a total cost associated with the motion plan. More particular details associated with one example implementation of scenario generator 206 are depicted relative to FIG. 3.

The optimization planner 208 can be configured to iteratively search over a motion planning space to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner 208 can be or include an iterative linear quadratic regulator or similar iterative solver. More particular details associated with one example implementation of optimization planner 208 are depicted relative to FIG. 4.

Once the optimization planner 208 has identified the optimal motion plan (or some other iterative break occurs), the optimal motion plan (e.g., optimized trajectory) can be selected and executed by the autonomous vehicle. For example, the motion planning system 105 can provide the selected motion plan to a vehicle controller 106 that controls one or more vehicle controls (e.g., actuators that control gas flow, steering, braking, etc.) to execute the selected motion plan until the next motion plan is generated.

Each of the world state generator 204, scenario generator 206, and optimization planner 208 can include computer logic utilized to provide desired functionality. In some implementations, each of world state generator 204, scenario generator 206, and optimization planner 208 can be implemented in hardware, firmware, and/or software controlling a general purpose processor. For example, in some implementations, each of world state generator 204, scenario generator 206, and optimization planner 208 includes program files stored on a storage device, loaded into a memory and executed by one or more processors. In other implementations, each of world state generator 204, scenario generator 206, and optimization planner 208 includes one or more sets of computer-executable instructions that are stored in a tangible computer-readable storage medium such as RAM hard disk or optical or magnetic media.

Figure 3:
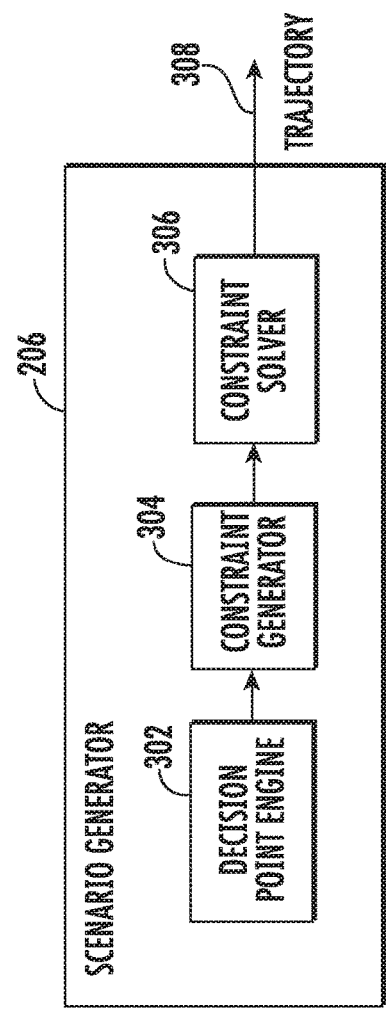
FIG. 3 depicts a block diagram of an example scenario generator according to example embodiments of the present disclosure.

FIG. 3 depicts a block diagram of an example scenario generator 206 according to example embodiments of the present disclosure. In some implementations, scenario generator 206 can include a decision point engine 302, a constraint generator 304, and a constraint solver 306. The output of the scenario generator 206 can correspond to a scenario represented by a trajectory 308 that is determined relative to perceived objects and corresponding constraints. The trajectory 308 can be communicated to the optimization planner 208, which can determine a motion plan optimized over a motion planning space defined by the trajectory.

With more particular reference to one aspect of the scenario generator 206, the decision point engine 302 can generally be configured to determine when it is appropriate to help preserve an AV's ability to stop without actually requiring the AV to stop. In some implementations, for example, a determination to help preserve the AV's ability to stop can be determined when the probability of interaction between the autonomous vehicle and the object is greater than a predetermined threshold probability value. When preserving an AV's ability to stop is desired, the constraint generator 304 can generate a speed zone constraint that defines an area within a multi-dimensional space that limits travel speed of the autonomous vehicle 10. The constraint generator 304 can additionally be configured to generate a plurality of other constraints based on where objects of interest are predicted to be relative to an autonomous vehicle. In some implementations, the speed zone constraint and the plurality of other constraints can be respectively defined as a constraint area in a multi-dimensional space (e.g., a path-time (PT) space) that identifies regions along the one or more travel paths that an autonomous vehicle cannot occupy at certain times. The constraint solver 306 within a scenario generator 206 can then identify navigation decisions for each of the constraints that provide a consistent solution across all constraints. The solution provided by the constraint solver 306 can be in the form of a trajectory determined relative to constraint areas for all objects of interest.

With more particular reference to the decision point engine 302, the decision point engine 302 can be configured to determine a stopping profile based at least in part on the object data obtained from the world state generator 204. The stopping profile can correspond to a curve that identifies a set of candidate states for the autonomous vehicle that preserves an ability of the autonomous vehicle 10 to stop before the interaction point with an object. In some implementations, the stopping profile can be determined based at least in part on the probability of interaction between the autonomous vehicle 10 and the object at an interaction point. In some implementations, the stopping profile can be determined based on a maximum deceleration value and a maximum jerk value. The maximum deceleration value can be indicative of a maximum level of force applied to a braking actuator associated with the autonomous vehicle, while the maximum jerk value can be indicative of a maximum rate of change for achieving the maximum deceleration value. In some implementations, the maximum deceleration value and maximum jerk value can be determined based on functional limitations associated with the AV's ability to implement a hard brake as fast as possible. In some implementations, the maximum deceleration value and maximum jerk value can be determined in keeping with a more moderate stopping profile (e.g., lower levels than associated with a hard brake) to help maintain greater levels of comfort to potential AV passengers.

In some implementations, the decision point engine 302 can additionally be configured to determine a linear representation of the estimated time of arrival of the autonomous vehicle 10 at the interaction point with an object. In such instances, the linear representation and the stopping profile can be plotted in or otherwise evaluated relative to a similar motion planning space. In some implementations, the decision point can be determined by selecting the state from the set of candidate states along the stopping profile based on where the stopping profile intersects with the linear representation of the estimated time of arrival of the autonomous vehicle 10 at the interaction point.

With more particular reference to the constraint generator 304, in some implementations, the constraints can be generated relative to one or more objects of interest having a predetermined manner of interaction with the autonomous vehicle 10 and/or one or more performance objectives associated with operation of the autonomous vehicle 10. Objects of interest, can include, for example, one or more of a vehicle, a pedestrian, a bicycle, a traffic light, a stop sign, a crosswalk, and a speed zone.

In some implementations, constraints can be generated by constraint generator 304 relative to one or more travel paths associated with an autonomous vehicle 10. A travel path, for example, may correspond to a predetermined potential path for an autonomous vehicle. As an example, in some instances, travel paths can generally correspond to common patterns of vehicle travel along one or more lanes (e.g., lanes on a roadway or other travelway). As one example, a travel path can generally describe a path by which a vehicle or other object may: continue according to its current lane; merge from its current lane into an adjacent lane; turn from the current lane into an adjacent road portion; or other pathways that correspond to other driving actions. In some implementations, travel paths can be defined relative to map data (e.g., map data 118) associated with various roadways, road portions or segments, lanes, or the like. For example, travel paths can be defined as a center line or other line parallel or in some predetermined relationship relative to such roadways, road portions or segments, lanes, or the like.

In some implementations, each constraint generated by constraint generator 304 can be generated relative to an object of interest and/or performance objective and can be defined as a constraint area in multi-dimensional space identifying regions along one or more travel paths that an autonomous vehicle 10 cannot be at certain times. In other words, each candidate maneuver considered by the constraint solver can be configured to represent a path through the multi-dimensional space that does not include the constraint areas. In some examples, the multi-dimensional space (e.g., a path time (PT) space) can include at least a time dimension and a distance dimension relative to travel along the one or more travel paths. Generally, each constraint area can identify regions along the travel path that an autonomous vehicle cannot be at certain times. In some implementations, each constraint area can be defined by one or more of a start time when the constraint begins, a stop time when the constraint ends, a start distance along the travel path when the constraint begins, a stop distance along the travel path when the constraint ends, and/or a maximum velocity that an autonomous vehicle can travel through the constraint area.

In some implementations, constraints can be generated by constraint generator 304 for the time dimension corresponding to a certain time period (e.g. a ten second time period) that includes a plurality of time steps (e.g., one second time intervals or less). In some implementations, constraints are generated based on how objects are classified according to each respective time step. For example, an object can be considered a blocking object during a first time step (t0, t1) but a non-blocking object during a second time step (t1, t2). As such, at each time step during a time period, an autonomy computing system can classify an object (e.g., by determining if the object is or is not blocking a lane) and generate a corresponding constraint based on the classification.

In some implementations, the constraint generator 304 can be further configured to generate one or more speed regressors. A speed regressor can be defined as a constraint area within multi-dimensional space in which an AV can travel, but with limitations on AV travel speed. As such, areas can defined within multi-dimensional space that control how fast an AV travels relative to specific areas in space and time (e.g., areas corresponding to other objects, areas corresponding to specific locations on a map, areas associated with a particular maneuver of the AV at a given time, etc.).

With more particular reference to another aspect of the scenario generator 206, the constraint solver 306 can be configured to employ a rollout method to determine an optimum speed profile from a plurality of candidate speed profiles for implementation by an autonomous vehicle 10. Each of the plurality of candidate speed profiles can be determined to satisfy a plurality of constraints generated for travel of the autonomous vehicle 10. Each candidate speed profile can provide a consistent solution across all constraints. A score for each candidate speed profile in the set of candidate speed profiles can be generated, and an optimum speed profile can be determined based at least in part on the scores for each candidate speed profile in the set of candidate speed profiles and on the relative need or preference for each type of candidate speed profile (e.g., the urgency to change lanes now as opposed to staying in a current lane). The score generated for each candidate speed profile can include one or more scoring factors, including but not limited to costs, discounts and/or rewards associated with aspects of a candidate speed profile for use in evaluation of a cost function or other scoring equation. Example scoring factors can include, for example, a dynamics cost for given dynamics (e.g., jerk, acceleration) associated with the candidate speed profile, a buffer cost associated with proximity of a candidate speed profile to one or more constraints within the multi-dimensional space, a constraint violation cost associated with violating one or more constraints, a reward or discount for one or more achieved performance objectives (e.g., distance traveled), a blind spot cost associated with a candidate maneuver that involves spending time in a blind spot of other actors (e.g., other vehicles).

In some implementations, the trajectory 308 determined by the scenario generator 206 is then provided to an optimization planner 208 within a motion planning system 105 to search over a motion planning space to identify a motion plan that optimizes a total cost associated with the motion plan. For example, an optimization planner 208 can be configured to iteratively search over a motion planning space to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner 208 can be or include an iterative linear quadratic regulator or similar iterative solver.

Once the optimization planner 208 has identified the optimal motion plan (or some other iterative break occurs), the optimal motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

Figure 4:
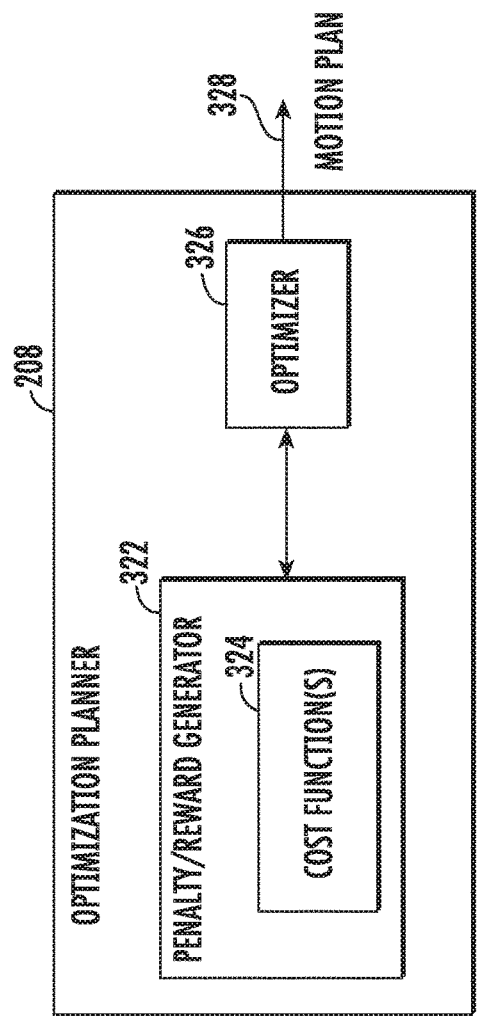
FIG. 4 depicts a block diagram of an example optimization planner according to example embodiments of the present disclosure.

FIG. 4 depicts a block diagram of an example optimization planner 208 according to example embodiments of the present disclosure. Generally, optimization planner 208 can include an iterative solver that searches over a motion planning space to identify a trajectory or motion plan that optimizes (e.g., locally optimizes) a total cost associated with the motion plan, as provided by one or more cost functions. In some implementations, the optimization planner 208 can include an iterative linear quadratic regulator configured to optimize the initial trajectory relative to multiple space dimensions (e.g., a lateral dimension associated with steering of the AV as well as a longitudinal dimension associated with braking/acceleration of the AV) for a given period of time.

According to an aspect of the present disclosure, the total cost can be based at least in part on one or more cost functions 324. In one example implementation, the total cost equals the sum of all costs minus the sum of all rewards and the optimization planner attempts to minimize the total cost. The cost functions 324 can be evaluated by a penalty/reward generator 322.

In some implementations, different cost function(s) 324 can be used depending upon a particular speed profile and/or associated set of navigation decisions represented by the speed profile as determined by scenario generator 206. The set of navigation decisions can then be used by optimization planner 208 within motion planning system 105 to search over a motion planning space to identify a motion plan that optimizes a total cost associated with the motion plan. Different sets of one or more cost functions 324 can correspond to the different navigation decisions determined by the scenario generator and penalty/reward generator 322 can load the cost function(s) 324 corresponding to the selected navigation decision(s) at each instance of motion planning.

In other implementations, the same cost function(s) 324 can be used at each instance of motion planning (e.g., no particular scenarios are used). In some implementations, the optimization planner 208 does not include the penalty/reward generator 322.

To provide an example cost function 324 for the purpose of illustration: a first example cost function can provide a first cost that is negatively correlated to a magnitude of a first distance from the autonomous vehicle to a proximate object of interest. Thus, if a candidate motion plan approaches a proximate object of interest, the first cost increases, thereby discouraging (e.g., through increased cost penalization) the autonomous vehicle from selecting motion plans that come undesirably close to the object. This first example cost function is provided only as an example cost function to illustrate the principle of cost. The first cost function is not required to implement the present disclosure. Many other and different cost functions 324 can be employed in addition or alternatively to the first cost function described above.

Furthermore, in some implementations, the cost function(s) 324 can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

Each of the penalty/reward generator 322 and optimizer 326 can include computer logic utilized to provide desired functionality. In some implementations, each of penalty/reward generator 322 and optimizer 326 can be implemented in hardware, firmware, and/or software controlling a general purpose processor. For example, in some implementations, each of penalty/reward generator 322 and optimizer 326 includes program files stored on a storage device, loaded into a memory and executed by one or more processors. In other implementations, each of penalty/reward generator 322 and optimizer 326 includes one or more sets of computer-executable instructions that are stored in a tangible computer-readable storage medium such as RAM hard disk or optical or magnetic media.

In some implementations, the optimization planner 208 can include one or more gain controllers configured to determine one or more gains. The gains determined by the one or more gain controllers can include, for example, one or more of a proportional gain, an integral action gain, or a derivative action gain associated with one or more parameters of a trajectory. For example, an optimization planner 208 can determine one or more gains associated with a lateral command and one or more gains associated with a longitudinal command. The lateral command can control lateral movement of an autonomous vehicle by controlling a steering actuator. The longitudinal command can control longitudinal movement of an autonomous vehicle by controlling braking and/or accelerator actuators.

Figure 5:
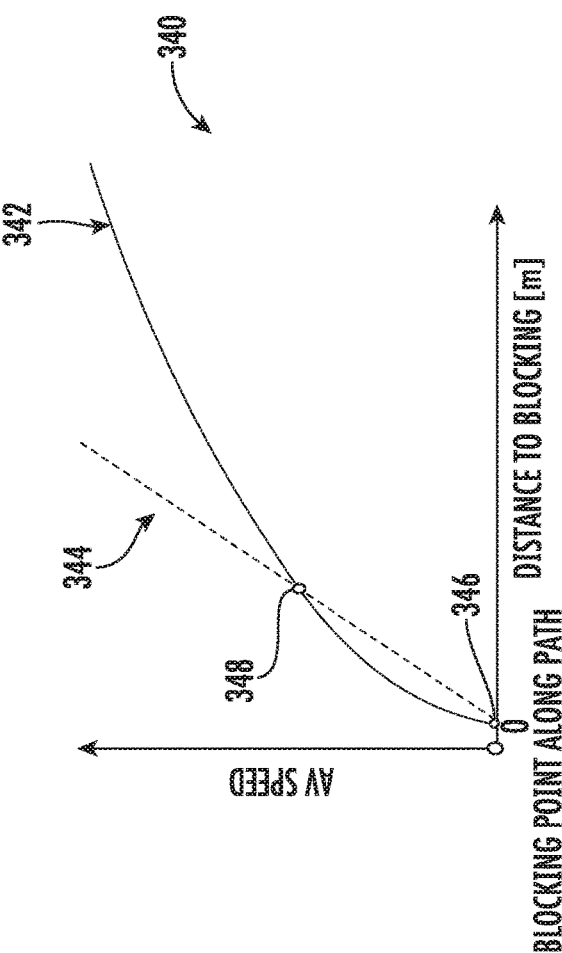
FIG. 5 depicts a first graphical representation associated with determining a decision point according to example embodiments of the present disclosure.

FIG. 5 depicts a first graphical representation associated with determining a decision point according to example embodiments of the present disclosure. More particularly, FIG. 5 depicts a graphical representation of a motion planning space 340 for determining a decision point in accordance with the disclosed technology. Motion planning space 340 corresponds to a two-dimensional space representative of a speed dimension (e.g., AV speed/velocity (v) as plotted along the vertical axis) and a distance dimension (e.g., distance (d) along a travel path as plotted along the horizontal axis). FIG. 5 depicts two example representations plotted within the motion planning space 340, namely a stopping profile representation 342 and an AV eta representation 344.

The stopping profile representation 342 of FIG. 5 corresponds to a curve that identifies a set of candidate states for the autonomous vehicle that preserves an ability of the autonomous vehicle 10 to stop before an interaction point 346 with an object. As mentioned earlier, the interaction point 346 can correspond to a point at which the object will block the AV from continuing to travel relative to a travel path. As such, every point on the stopping profile representation 342 represents an initial state defined by some AV velocity (v) assumed to have zero acceleration that stops at exactly the interaction point (e.g., distance (d=0)) under the same stopping policy. The stopping policy can be defined by a maximum deceleration value and a maximum jerk value. The maximum deceleration value can be indicative of a maximum level of force applied to a braking actuator associated with the autonomous vehicle, while the maximum jerk value can be indicative of a maximum rate of change for achieving the maximum deceleration value. In some implementations, the maximum deceleration value and maximum jerk value can be determined based on functional limitations associated with the AV's ability to implement a hard brake as fast as possible. In some implementations, the maximum deceleration value and maximum jerk value can be determined in keeping with a more moderate stopping profile (e.g., lower levels than associated with a hard brake) to help maintain greater levels of comfort to potential AV passengers.

The maximum deceleration value and maximum jerk value defined by the stopping policy for a stopping profile can help implement a degree of caution in the motion planning of the autonomous vehicle relative to the AV's interaction with another object, seen or unseen. For example, if the AV is passing a pedestrian in a state where it is possible but not likely for the pedestrian to walk out in front of the AV, then it may be desired for the AV to preserve the ability to brake for the pedestrian in the event that the pedestrian walks out in front of the AV. Because this interaction is unlikely, the braking profile being a hard brake may be acceptable. Conversely, if interaction with the pedestrian is moderately likely then it may be desired for the AV to be in a state where instead of hard braking the AV preserves an ability to execute a more moderate deceleration.

Determination of a stopping profile such as represented by stopping profile representation 342 of FIG. 5 helps determine a trajectory and corresponding motion plan for the AV by defining a plurality of possible candidate states through which the AV trajectory must travel while going as fast as possible while still preserving safety relative to a given object identified along one or more travel paths. A stopping profile (e.g., as depicted via stopping profile representation 342) can be used to help identify which point on this curve at which the AV should travel through. In some implementations, a decision point can be determined as one of the candidate states defined by stopping profile representation 342.

In some implementations, the selection of a particular candidate state from the plurality of candidate states as the decision point can be based at least in part on determination of a particular decision point as the point at which the AV computing system determines that the AV either has to stop for a given object or knows it can pass the given object because the AV computing system has updated information on the state of the world (e.g., a via world state generator). In some instances, however, the AV computing system never receives updated information about the world. This happens when the occlusion surface is parallel to travel and close to the AV. Eventually the AV gets to a point and speeds along a travel path that it expects to be able to clear the given object and therefore does not need to protect itself against a possibility of interaction. That means that even if the AV identifies a given object acting in a particular possible fashion, on the next cycle the AV would expect to pass the object anyways. In other instances, the AV computing system will get more information before the AV expects to clear the given object. Other times you expect to clear before you get more information. However, answering the question of when you expect to get more information is very difficult in a fast, conservative fashion. Determining when the AV expects to clear a given object is a relatively easier determination for an AV computing system. As such, in some implementations, a decision point can be determined relative to the stopping profile representation 342 as well as the AV eta representation 344.

The AV eta representation 344 of FIG. 5 corresponds to a linear representation of the estimated time of arrival of the autonomous vehicle at the interaction point with an object. The estimated time of arrival can be determined based on the AV operating with a constant rate of change of AV speed (e.g., a constant deceleration value) given a known interaction point 346 for a particular object along the AV's travel path. In other words, AV eta representation 344 can correspond to an "expect to clear" line that is formed by all speeds which have an equivalent eta_s for the AV and a given object. Any states to the left of the line depicted by AV eta representation 344 correspond to states where the AV is expected to arrive before the given object. Any states to the right of the line depicted by AV eta representation 344 correspond to states where the AV is expected to arrive after the given object.

In some implementations, decision point 348 can be determined by selecting the state from the set of candidate states along the stopping profile representation 342 based on where the stopping profile representation 342 intersects with the AV eta representation 344. The decision point 348 represents a singular target state (distance, velocity, acceleration=0) corresponding to the last point at which if the AV identifies the given object in real life, the AV could still stop but on the next cycle to be able to pass the same object. In other words, decision point 348 or other decision point selected along the stopping profile representation 342 can correspond to the point at which the AV either executes a braking profile at the desired deceleration rate or not. For steady state events (e.g., events X which do not change cycle over cycle), the decision point is the point at which an AV is preserving the ability to brake on this cycle but on the next cycle expects to be past the interaction with X.

Figure 6:
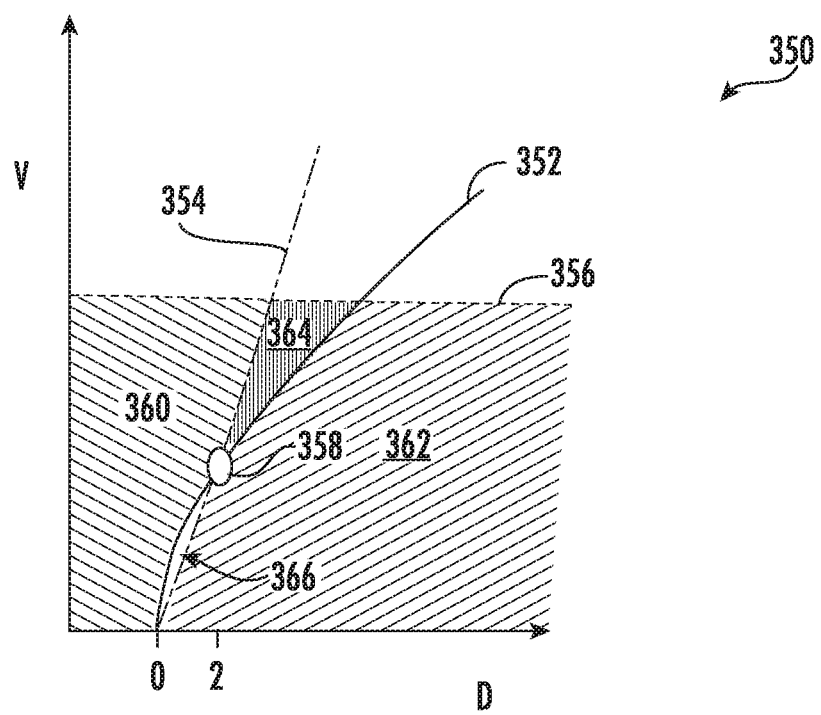
FIG. 6 depicts a second graphical representation associated with determining a decision point according to example embodiments of the present disclosure.

FIG. 6 depicts a second graphical representation associated with determining a decision point according to example embodiments of the present disclosure. More particularly, FIG. 6 depicts different regions 360-366, respectively, that an AV can find itself in when determining a decision point and motion plan relative to a given object identified in proximity to a travel path of the AV in accordance with the disclosed technology. More particularly, motion planning space 350 includes an example stopping profile representation 352 and an example AV eta representation 354, which are similar in respects to example stopping profile representation 342 and example AV eta representation 344 of FIG. 5. Also depicted within motion planning space 350 is an example speed limit representation 356, which depicts an upper limit on possible values for speed/velocity (v) of the AV, and an example decision point 358. First region 360 is defined as the area to the left of both the stopping profile representation 352 and the AV eta representation 354. First region 360 represents an area in which the AV will be clear of the given object assuming constant velocity of the AV. Second region 362 corresponds to the region to the right of both the stopping profile representation 352 and the AV eta representation 354. In the second region 362, the AV won't reach the interaction point before the given object but still has the ability to emergency brake and stop if needed or desired. Third region 364 corresponds to a region to the left of stopping profile representation 352 but to the right of AV eta representation 354. Third region 364 represents a region in which the AV won't clear the given object and may not be able to emergency brake to stop before the interaction point with the given object. Fourth region 366 corresponds to a region to the right of stopping profile representation 352 but to the left of AV eta representation 354. Fourth region 366 represents a region where the AV both can emergency brake avoiding interaction with the given object and can pass the given object.

Figure 7:
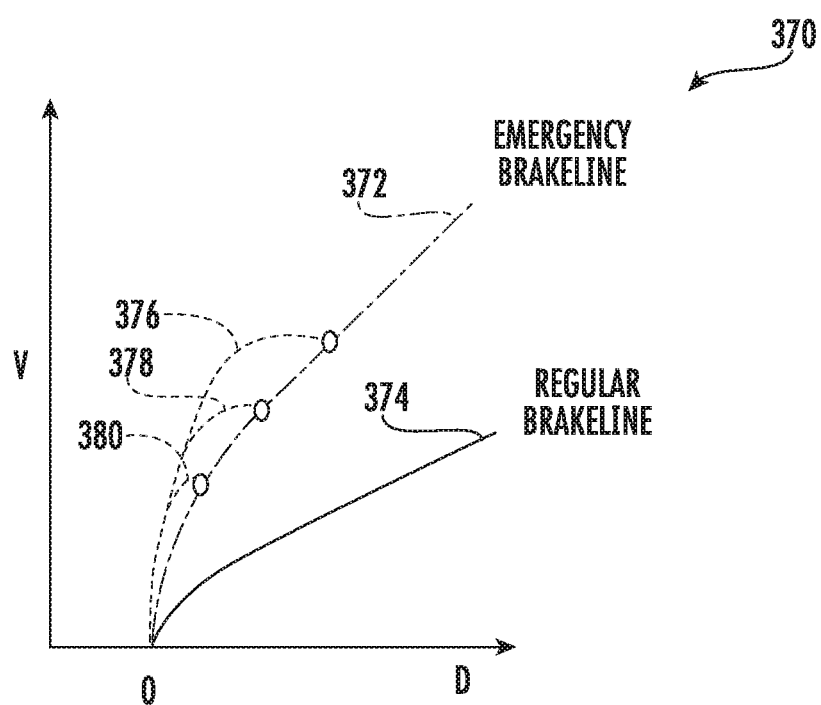
FIG. 7 depicts a third graphical representation associated with determining a decision point according to example embodiments of the present disclosure.

FIG. 7 depicts a third graphical representation associated with determining a decision point according to example embodiments of the present disclosure. More particularly, FIG. 7 depicts a motion planning space 370 in which a first stopping profile 372 and second stopping profile 374 are plotted. First stopping profile 372 corresponds to a curve that identifies a set of candidate states for the autonomous vehicle that preserves an ability of the autonomous vehicle 10 to stop before an interaction point 346 while implementing a stopping policy (e.g., maximum deceleration value and maximum jerk value) consistent with a hard brake (e.g., an emergency brake). Second stopping profile 374 corresponds to a curve that identifies a set of candidate states for the autonomous vehicle that preserves an ability of the autonomous vehicle 10 to stop before an interaction point 346 while implementing a stopping policy (e.g., maximum deceleration value and maximum jerk value) consistent with a moderate brake (e.g., regular brake). Considering the stopping policy associated with first stopping profile 372, it should be appreciated that at every distance from blocking (e.g., the interaction point), there is some max speed at a=0 at which the AV is no longer able to make an emergency stop with the deceleration/jerk limits associated with this stopping profile. This forms a curve in speed-distance space represented by first stopping profile 372. The first stopping profile 372 is a curve that cannot be traveled by the AV because it represents a curve of points at which the AV can decide to switch from braking to accelerating (traveling through a=0) and still preserve the ability to stop for a worst case scenario. The set of sample curves 376-380 represent sample lines which start from the emergency brake line and stop exactly at 0. The sample curves 376-380 are curves beginning at respective initial states along first stopping profile 372, defined by respective values (along_path d, v, a=0), and all ending at the same interaction point.

Figure 8:
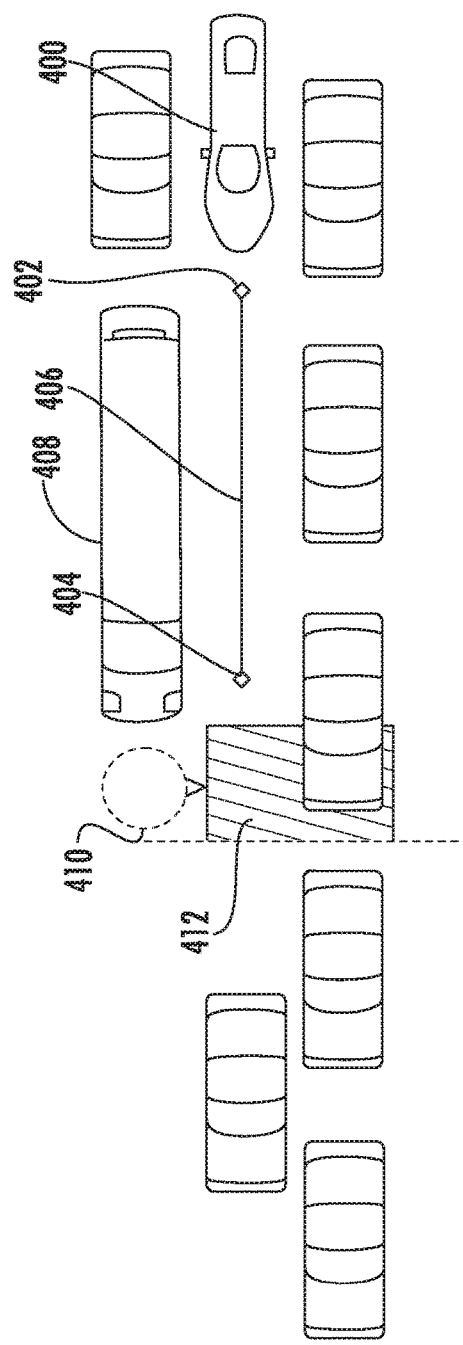
FIG. 8 depicts a graphical representation of an occlusion example associated with an autonomous vehicle and a decision point determination according to example embodiments of the present disclosure.

FIG. 8 depicts a graphical representation of an occlusion example associated with an autonomous vehicle and a decision point determination according to example embodiments of the present disclosure. More particularly, FIG. 8 depicts a graphical representation of an AV 400 moving from a first state 402 to a second state 404 along a travel path 406. Other nearby vehicles can be in travel lanes adjacent to the travel lane of AV 400 associated with travel path 406. In the occlusion hypothetical of FIG. 8, bus 408 at least partially blocks the view of AV 400 from identifying a pedestrian 410 standing near bus 408. Although unlikely that pedestrian 410 will move out of the occlusion edge 412 into the travel path of AV 400, the described decision point technology can be implemented so that a trajectory and/or motion plan associated with travel of AV 400 preserves an ability of the AV 400 to stop before an interaction point associated with pedestrian 410. In order to best plan for AV 400 protecting itself against a worst case actor, a motion planning system can determine object data associated with pedestrian 410 that depicts some "worst-case" speed. For example, the pedestrian 410 can be associated with object data predicting that the pedestrian moves to block the AV's lane of travel with some ETA and some along track speed. For the pedestrian 410 crossing across the AV travel path 406, a presumed along track speed can be 0, but a cross track speed can be some positive value. This hypothetical object data can be used to form an object tuple descriptive of pedestrian 410. The object tuple can include the probability of interaction between AV 400 and pedestrian 410 as well as other variables such as but not limited to an estimated time to interaction between AV 400 and pedestrian 410, a distance to interaction (e.g., distance as defined along travel path 406), velocity along track (e.g., longitudinal speed as measured along travel path 406), velocity cross track (e.g., lateral speed as measured along travel path 406), etc. This object data can be used to determine a stopping profile for AV 400 that can help determine a corresponding decision point and associated trajectory for the AV 400 that preserves the AV's ability to hard brake for pedestrian 410 in the low probability case that the pedestrian 410 moves out of occlusion edge 412.

Figure 9:
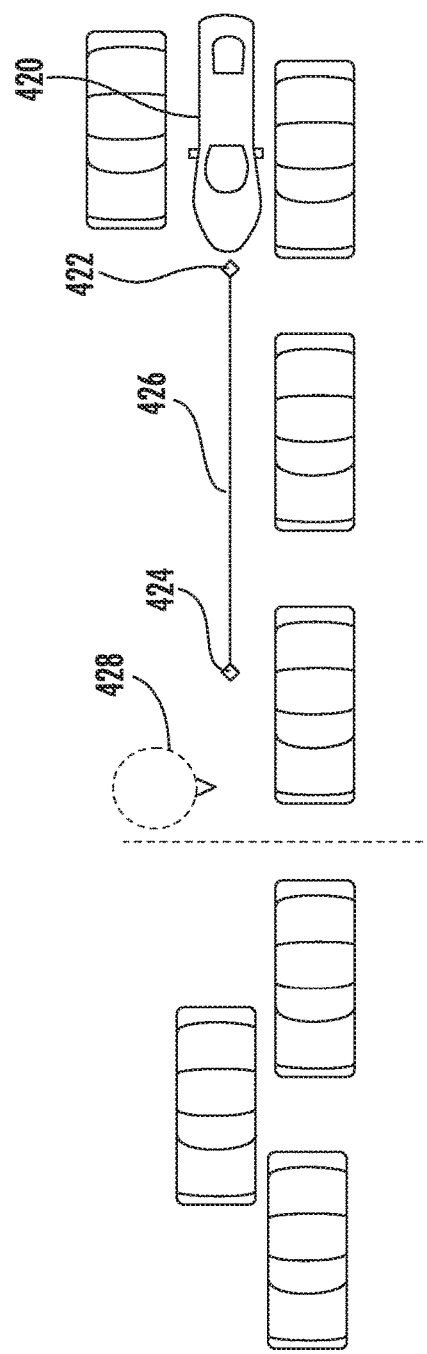
FIG. 9 depicts a graphical representation of a yield example associated with an autonomous vehicle and a decision point determination according to example embodiments of the present disclosure.

FIG. 9 depicts a graphical representation of a yield example associated with an autonomous vehicle and a decision point determination according to example embodiments of the present disclosure. More particularly, FIG. 9 depicts a graphical representation of an AV 420 moving from a first state 422 to a second state 424 along a travel path 426. Other nearby vehicles can be in travel lanes adjacent to the travel lane of AV 420 associated with travel path 426. In the yield hypothetical of FIG. 9, pedestrian 428 can be considered as approaching a yield interaction with the AV 420. The AV 420 has right of way, but the other actor represented by pedestrian 428 may violate the right of way of AV 420 and cause the AV 420 to yield to the pedestrian 428 against rules of the road.

The yield hypothetical depicted in FIG. 9 is a similar case to the occlusion hypothetical depicted in FIG. 8. For every potential trajectory of the pedestrian 428, the AV computing system can generate an object tuple (M(q), d, v-along-path, eta_s) similar to the occlusion case. However, there may be additional variables to consider within the object data associated with pedestrian 428. In the analysis of pedestrian 410 of FIG. 8, pedestrian 410 was un-observed so the speed bounds for the actor had to be considered within a range of (0, max cross track speed) which means there was no meaningful eta to leaving. With an observed actor such as pedestrian 428 having some measured speed, there can be a meaningful leading edge and trailing edge to the analysis. A worst case leaving trajectory for pedestrian 428 can be represented as a trajectory that leaves the lane at the last possible point and time. Just like the leading trajectory can be used to answer the question of whether or not AV 420 expects to clear the pedestrian 428 before pedestrian 428 enters travel path 426, we can use a trailing trajectory associated with pedestrian 428 to determine whether or not the AV 420 expects to clear the pedestrian 428 after the pedestrian 428 leaves the travel path 426.

Referring still to FIG. 9, time can be discretized such that each point of the trajectory can be considered. Prediction data associated with pedestrian 428 can be used to determine object tuples of the form (M(q), d, v-along-path, eta_s). These tuples represent the discrete expectations for blocking along path for pedestrian 428. If these tuples represent samples from a continuous, pocket-less probability space (e.g., where the AV 420 cannot be between two modes), then the AV 420 should only respond if it expects to be unable to pass some constraint or expecting to pass behind every constraint. In other words, a determination can be made by a decision point engine as to whether it is desirable to preserve the ability of AV 420 to stop for pedestrian 428 only if the AV computing system determines that the AV isn't predicted to pass the leading edge of the probability surface and also won't be clearing the trailing edge either. If this threshold of analysis is met, then the collection of object tuples can be passed to a decision point engine as described herein and used to determine a stopping profile for AV 420 that can help determine a corresponding decision point and associated trajectory for the AV 420 that preserves the AV's ability to brake for pedestrian 428.

Figure 10:
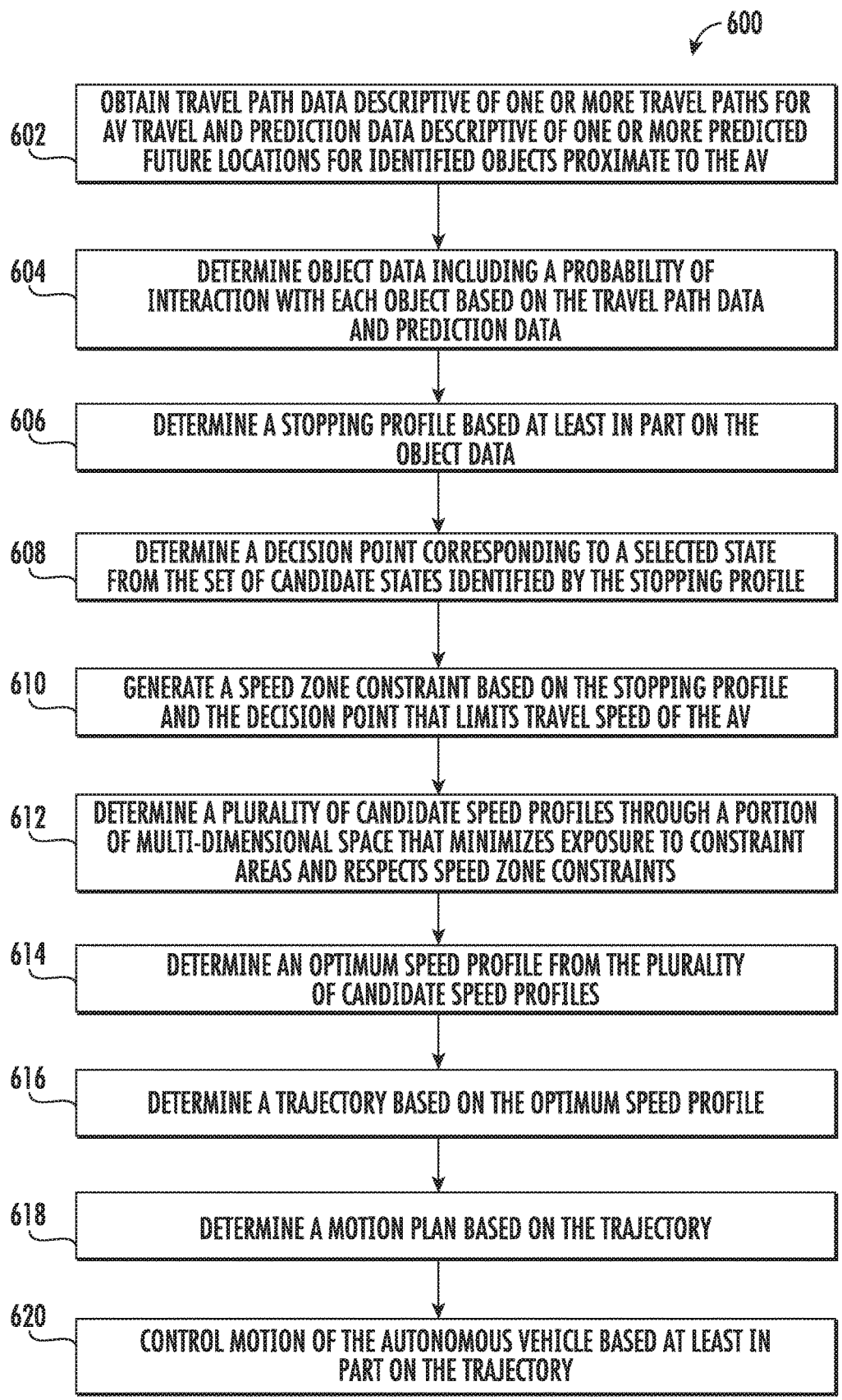
FIG. 10 depicts a flow chart diagram of an example method according to example embodiments of the present disclosure.

Referring more particularly to FIG. 10, a computing system (e.g., autonomy computing system 102 of FIGS. 1 and 12) including one or more computing devices can implement one or more steps of method 600. At 602, method 600 can include obtaining travel path data and prediction data associated with current travel by an autonomous vehicle. More particularly, travel path data obtained at 602 can include data descriptive of one or more predetermined potential travel paths of the autonomous vehicle based on a common pattern of vehicle travel along one or more lanes of a roadway. Prediction data obtained at 602 can include data descriptive of one or more predicted future locations for identified objects proximate to the AV.

At 604, method 600 can include determining or otherwise obtaining object data associated with at least one object identified near an AV. In some implementations, the object data determined or otherwise obtained at 604 can be determined from the travel path data descriptive of the one or more travel paths and the prediction data descriptive of one or more predicted future locations for identified objects proximate to the autonomous vehicle, as determined or otherwise obtained at 602. In some implementations, the object data determined or otherwise obtained at 604 can include the probability of interaction between the autonomous vehicle and the object at the interaction point. In some implementations, the object data determined or otherwise obtained at 604 can correspond to an object tuple defining a sequence of variables descriptive of the object. The tuple can include the probability of interaction as well as other variables such as but not limited to an estimated time to interaction, distance to interaction (e.g., distance as defined along one or more travel paths), velocity along track (e.g., longitudinal speed as measured along one or more travel paths), velocity cross track (e.g., lateral speed as measured along one or more travel paths), etc.

At 606, the method 600 can include determining a stopping profile based at least in part on the object data determined or obtained at 604. In some implementations, the stopping profile determined at 606 identifies a set of candidate states for the autonomous vehicle that preserves an ability of the autonomous vehicle to stop before the interaction point with a given object. In some implementations, determining a stopping profile at 606 can be determined based at least in part on the probability of interaction between the autonomous vehicle and the object at the interaction point. In some implementations, determining a stopping profile at 606 can be implemented when the probability of interaction between the autonomous vehicle and the object is greater than a predetermined threshold probability value. In some implementations, the stopping profile determined at 606 can be based on a stopping policy defined by a maximum deceleration value and a maximum jerk value. The maximum deceleration value can be indicative of a maximum level of force applied to a braking actuator associated with the autonomous vehicle, and the maximum jerk value is indicative of a maximum rate of change for achieving the maximum deceleration value. Stopping policies can be defined by different levels corresponding to different levels of braking force, such as associated with a hard/emergency brake, a moderate/regular brake or other varied levels.

At 608, the method 600 can include determining a decision point corresponding to a selected state from the set of candidate states identified by the stopping profile from 606. In some implementations, determining the decision point at 608 corresponds to determining the selected state from the set of candidate states based on where the stopping profile intersects with a linear representation of the estimated time of arrival of the autonomous vehicle at the interaction point.

At 610, the method 600 can include generating a speed zone constraint based on the stopping profile and the decision point that defines an area within a multi-dimensional space that limits a travel speed of the autonomous vehicle. In some implementations, a speed zone constraint generated at 610 and a plurality of other constraints for other identified objects are respectively defined as a constraint area in the multi-dimensional space that identifies regions along the one or more travel paths that an autonomous vehicle cannot occupy at certain times. For example, the multi-dimensional space can be characterized by at least a time dimension and a distance dimension relative to travel along the one or more travel paths.

At 612, the method 600 can include determining a plurality of candidate speed profiles through a portion of multi-dimensional space that minimizes exposure to constraint areas and respects speed zone constraints. Each of the plurality of candidate speed profiles determined at 612 can be determined to satisfy the speed zone constraint and a plurality of other constraints associated with travel by the autonomous vehicle.

At 614, the method 600 can include determining an optimum speed profile from the plurality of speed profiles for implementation by the autonomous vehicle as determined at 612. In some implementations, determining an optimum speed profile at 614 can be determined at least in part by a rollout method. Each of the plurality of candidate speed profiles determined at 612 can be determined to satisfy a plurality of constraints generated for travel of the autonomous vehicle. Each candidate speed profile can provide a consistent solution across all constraints. A score for each candidate speed profile in the set of candidate speed profiles can be generated, and an optimum speed profile can be determined at 614 based at least in part on the scores for each candidate speed profile in the set of candidate speed profiles and on the relative need or preference for each type of candidate speed profile (e.g., the urgency to change lanes now as opposed to staying in a current lane). The score generated for each candidate speed profile can include one or more scoring factors, including but not limited to costs, discounts and/or rewards associated with aspects of a candidate speed profile for use in evaluation of a cost function or other scoring equation. Example scoring factors can include, for example, a dynamics cost for given dynamics (e.g., jerk, acceleration) associated with the candidate speed profile, a buffer cost associated with proximity of a candidate speed profile to one or more constraints within the multi-dimensional space, a constraint violation cost associated with violating one or more constraints, a reward or discount for one or more achieved performance objectives (e.g., distance traveled), a blind spot cost associated with a candidate maneuver that involves spending time in a blind spot of other actors (e.g., other vehicles).

At 616, the method 600 can include determining a trajectory for the autonomous vehicle based on the optimum speed profile for implementation by the autonomous vehicle. As such, determining a trajectory for the autonomous vehicle at 616 can be based at least in part on the decision point.

At 618, the method 600 can include determining a motion plan based at least in part on the trajectory determined at 616. In some implementations, the motion plan can be determined at 618 by an iterative solver configured to identify a motion plan that optimizes a total cost associated with the motion plan. In some implementations, the iterative solver used for determining a motion plan at 618 can include a gain controller configured to determine one or more gains associated with a lateral command and one or more gains associated with a longitudinal command. In some implementations, the iterative solver used for determining an motion plan at 618 can include an iterative linear quadrative regulator configured to optimize the trajectory relative to multiple space dimensions for a given period of time.

At 620, method 600 can include controlling motion of the autonomous vehicle (e.g., autonomous vehicle 10 of FIG. 1) based at least in part on the motion plan embodied by the trajectory determined at 616 or the motion plan determined at 618.

Although FIG. 10 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

Figure 11:
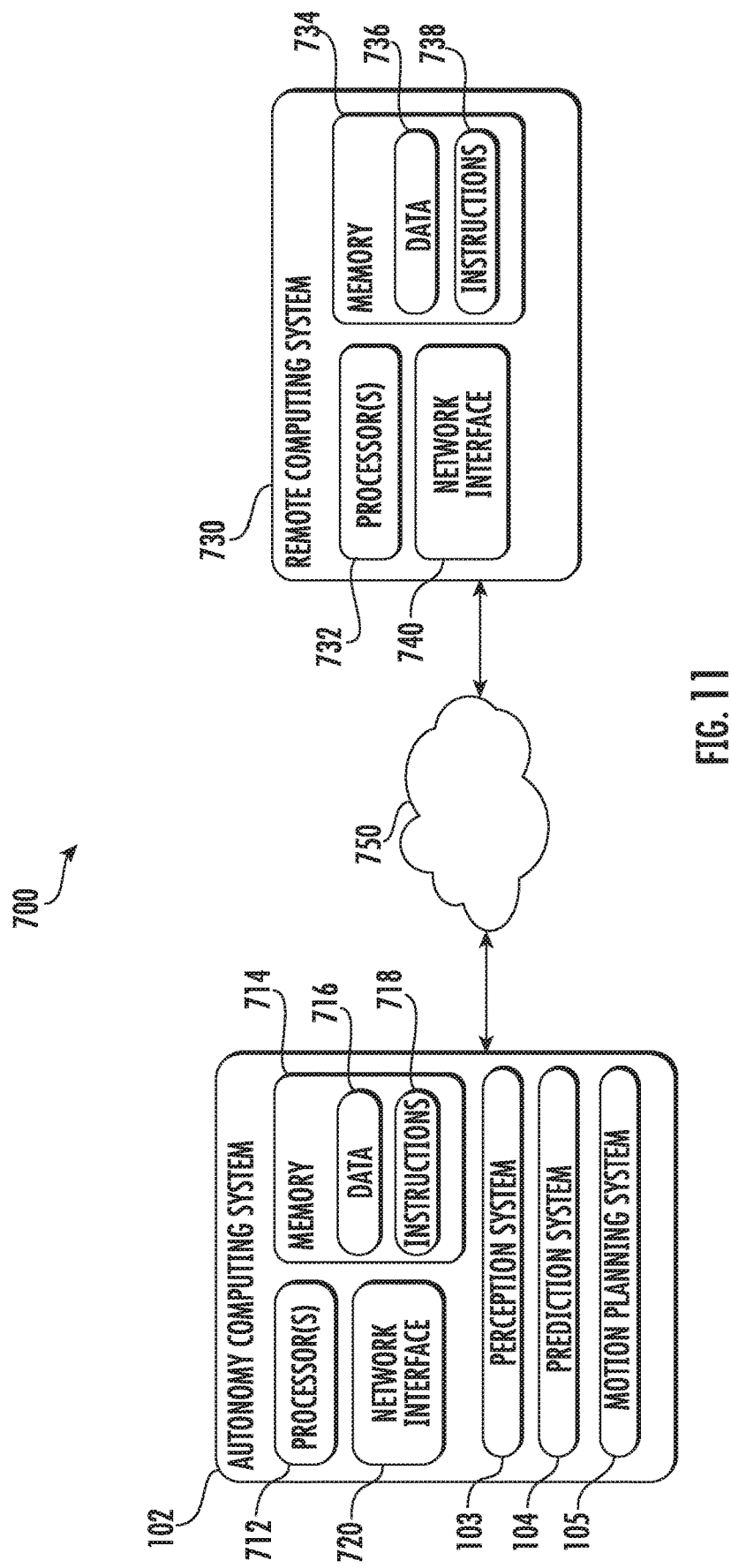
FIG. 11 depicts a block diagram of an example computing system according to example embodiments of the present disclosure.

FIG. 11 depicts a block diagram of an example computing system 700 according to example embodiments of the present disclosure. The example system 700 includes an autonomy computing system 102 and a remote computing system 730 that are communicatively coupled over a network 750.

In some implementations, the autonomy computing system 102 can implement a scenario generator or otherwise control the motion of an autonomous vehicle (e.g., autonomous vehicle 10). In some implementations, the autonomy computing system 102 can be included in an autonomous vehicle. For example, the autonomy computing system 102 can be on-board the autonomous vehicle. In other implementations, the autonomy computing system 102 is not located on-board the autonomous vehicle. The autonomy computing system 102 can include one or more distinct physical computing devices.

The autonomy computing system 102 includes one or more processors 712 and a memory 714. The one or more processors 712 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 714 can include one or more non-transitory computer-readable storage media, such as RAM, ROM, EEPROM, EPROM, one or more memory devices, flash memory devices, etc., and combinations thereof.

In some implementations, the memory 714 can store instructions that when executed by the one or more processors 712 cause the processor to perform operations implemented by one or more of the perception system 103, prediction system 104 and motion planning system 105 as described herein.

The memory 714 can store information that can be accessed by the one or more processors 712. For instance, the memory 714 (e.g., one or more non-transitory computer-readable storage mediums, memory devices) can store data 716 that can be obtained, received, accessed, written, manipulated, created, and/or stored. The data 716 can include, for instance, object data, constraints, speed profiles, candidate maneuvers, initial trajectories, optimized trajectories, motion plans and related autonomy data as described herein. In some implementations, the autonomy computing system 102 can obtain data from one or more memory device(s) that are remote from the system 102.

The memory 714 can also store computer-readable instructions 718 that can be executed by the one or more processors 712. The instructions 718 can be software written in any suitable programming language or can be implemented in hardware. Additionally, or alternatively, the instructions 718 can be executed in logically and/or virtually separate threads on processor(s) 712.

For example, the memory 714 can store instructions 718 that when executed by the one or more processors 712 cause the one or more processors 712 to perform any of the operations and/or functions described herein, including, for example, some or all of the operations described with reference to method 600 of FIG. 8.

Autonomy computing system 102 can also include a network interface 720 used to communicate with one or more systems or devices, including systems or devices that are remotely located from the autonomy computing system 102. The network interface 720 can include any circuits, components, software, etc. for communicating with one or more networks (e.g., network 750). In some implementations, the network interface 720 can include, for example, one or more of a communications controller, receiver, transceiver, transmitter, port, conductors, software, and/or hardware for communicating data.

The remote computing system 730 can correspond to an operations computing system associated with an entity (e.g., a service provider) that provides one or more vehicle service(s) to a plurality of users via a fleet of vehicles that includes, for example, the autonomous vehicle 10 of FIG. 1. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc.

Remote computing system 730 can include one or more distinct physical computing devices that respectively include one or more processors 732 and at least one memory 734. The one or more processors 732 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof.

The memory 734 can store data 736 and instructions 738 which are executed by the processor 732 to cause remote computing system 730 to perform operations. The instructions 738 can be software written in any suitable programming language or can be implemented in hardware. Additionally, or alternatively, the instructions 738 can be executed in logically and/or virtually separate threads on processor(s) 732. For example, the memory 734 can store instructions 738 that when executed by the one or more processors 732 cause the one or more processors 732 to perform any of the operations and/or functions described herein, for example, one or more of operations 602-620 of FIG. 8.

Remote computing system 730 can also include a network interface 740 used to communicate with one or more systems or devices, including systems or devices that are remotely located from the remote computing system 730. The network interface 740 can include any circuits, components, software, etc. for communicating with one or more networks (e.g., network 750). In some implementations, the network interface 740 can include, for example, one or more of a communications controller, receiver, transceiver, transmitter, port, conductors, software, and/or hardware for communicating data.

The network(s) 750 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 750 can be accomplished, for instance, via a network interface using any type of protocol, protection scheme, encoding, format, packaging, etc.

FIG. 11 illustrates one example system 700 that can be used to implement the present disclosure. Other computing systems can be used as well. In addition, components illustrated and/or discussed as being included in one of the computing systems 102 and/or 730 can instead be included in another of the computing systems 102 and/or 730. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for autonomous vehicle control, the computing system comprising:
   one or more processors; and
   one or more non-transitory computer-readable media that store instructions that, when executed by the one or more processors, cause the computing system to perform operations, the operations comprising:
     obtaining object data associated with an object identified near one or more travel paths of an autonomous vehicle, wherein the object data comprises at least a probability of interaction between the autonomous vehicle and the object at an interaction point;
     determining a stopping profile based at least in part on the object data, wherein the stopping profile identifies a set of candidate states for the autonomous vehicle that preserves an ability of the autonomous vehicle to stop before the interaction point;
     determining a decision point corresponding to a selected state from the set of candidate states identified by the stopping profile;
     generating a speed zone constraint based at least in part on the stopping profile and the decision point that defines an area within a multi-dimensional space that limits a travel speed of the autonomous vehicle;
     determining an optimum speed profile from a plurality of speed profiles for implementation by the autonomous vehicle, wherein each of the plurality of speed profiles is determined to satisfy the speed zone constraint and a plurality of other constraints associated with travel by the autonomous vehicle;
     determining a trajectory for the autonomous vehicle based at least in part on the optimum speed profile for implementation by the autonomous vehicle; and
     controlling motion of the autonomous vehicle based at least in part on the trajectory.

2. The computing system of claim 1, wherein determining the decision point comprises determining the selected state from the set of candidate states based at least in part on where the stopping profile intersects with a linear representation of an estimated time of arrival of the autonomous vehicle at the interaction point.

3. The computing system of claim 1, wherein the speed zone constraint and the plurality of other constraints are respectively defined as a constraint area in the multi-dimensional space that identifies regions along the one or more travel paths that the autonomous vehicle cannot occupy at certain times, wherein the multi-dimensional space comprises at least a time dimension and a distance dimension relative to travel along the one or more travel paths.

4. The computing system of claim 1, wherein the stopping profile is determined based at least in part on the probability of interaction between the autonomous vehicle and the object at the interaction point.

5. The computing system of claim 1, wherein determining the stopping profile based at least in part on the object data is implemented when the probability of interaction between the autonomous vehicle and the object is greater than a predetermined threshold probability value.

6. The computing system of claim 1, wherein the stopping profile is determined based at least in part on a maximum deceleration value and a maximum jerk value, wherein the maximum deceleration value is indicative of a maximum level of force applied to a braking actuator associated with the autonomous vehicle, and wherein the maximum jerk value is indicative of a maximum rate of change for achieving the maximum deceleration value.

7. The computing system of claim 1, wherein the object data including the probability of interaction between the autonomous vehicle and the object at the interaction point is determined from travel path data descriptive of the one or more travel paths and prediction data descriptive of one or more predicted future locations for identified objects proximate to the autonomous vehicle.

8. The computing system of claim 7, wherein the travel path data is descriptive of one or more predetermined potential travel paths of the autonomous vehicle based at least in part on a common pattern of vehicle travel along one or more lanes of a roadway.

9. A computer-implemented method, comprising:
  obtaining, object data associated with one or more objects identified near one or more travel paths of an autonomous vehicle, wherein the object data comprises at least a probability of interaction between the autonomous vehicle and at least one of the objects at an interaction point;
  determining, a stopping profile based at least in part on the object data, wherein the stopping profile identifies a set of candidate states for the autonomous vehicle that preserves an ability of the autonomous vehicle to stop before the interaction point;
  determining, a decision point corresponding to a selected state from the set of candidate states identified by the stopping profile, wherein the decision point is determined based at least in part on where the stopping profile intersects with a linear representation of an estimated arrival time of the autonomous vehicle at the interaction point;
  generating a speed zone constraint based at least in part on the stopping profile and the decision point that defines an area within a multi-dimensional space that limits a travel speed of the autonomous vehicle;
  determining an optimum speed profile from a plurality of speed profiles for implementation by the autonomous vehicle, wherein each of the plurality of speed profiles is determined to satisfy the speed zone constraint and a plurality of other constraints associated with travel by the autonomous vehicle;
  determining, by the computing system, a trajectory for the autonomous vehicle based at least in part on the optimum speed profile for implementation by the autonomous vehicle; and
  controlling, motion of the autonomous vehicle based at least in part on the trajectory.

10. The computer-implemented method of claim 9, wherein the speed zone constraint and the plurality of other constraints are respectively defined as a constraint area in the multi-dimensional space that identifies regions along the one or more travel paths that the autonomous vehicle cannot occupy at certain times, wherein the multi-dimensional space comprises at least a time dimension and a distance dimension relative to travel along the one or more travel paths.

11. The computer-implemented method of claim 9, wherein the stopping profile is determined based at least in part on the probability of interaction between the autonomous vehicle and the at least one of the objects at the interaction point.

12. The computer-implemented method of claim 9, wherein determining the stopping profile based at least in part on the object data is implemented when the probability of interaction between the autonomous vehicle and the at least one of the objects is greater than a predetermined threshold probability value.

13. The computer-implemented method of claim 9, wherein the stopping profile is determined based at least in part on a maximum deceleration value and a maximum jerk value, wherein the maximum deceleration value is indicative of a maximum level of force applied to a braking actuator associated with the autonomous vehicle, and wherein the maximum jerk value is indicative of a maximum rate of change for achieving the maximum deceleration value.

14. The computer-implemented method of claim 9, wherein the object data including the probability of interaction between the autonomous vehicle and the at least one of the objects at the interaction point is determined from travel path data and prediction data, wherein the travel path data is descriptive of one or more predetermined potential paths for travel of the autonomous vehicle based at least in part on a common pattern of vehicle travel along one or more lanes of a roadway, and wherein the prediction data is descriptive of one or more predicted future locations for identified objects proximate to the autonomous vehicle.

15. An autonomous vehicle, comprising:
  one or more processors; and
  one or more non-transitory computer-readable media that collectively store instructions that, when executed by the one or more processors, cause the one or more processors to perform operations, the operations comprising:
    obtaining object data associated with one or more objects identified near one or more travel paths of the autonomous vehicle, wherein the object data comprises at least a probability of interaction between the autonomous vehicle and at least one of the one or more objects at an interaction point;
    determining a stopping profile based at least in part on the object data, wherein the stopping profile identifies a set of candidate states for the autonomous vehicle that preserves an ability of the autonomous vehicle to stop before the interaction point;
    determining a decision point corresponding to a selected state from the set of candidate states identified by the stopping profile;

generating a speed zone constraint based at least in part on the stopping profile and the decision point that defines an area within a multi-dimensional space that limits travel speed of the autonomous vehicle; and determining an optimum speed profile from a plurality of speed profiles for implementation by the autonomous vehicle, wherein each of the plurality of speed profiles is determined to satisfy the speed zone constraint and a plurality of other constraints associated with travel by the autonomous vehicle;

determining a trajectory based at least in part on the optimum speed profile for implementation by the autonomous vehicle; and controlling motion of the autonomous vehicle based at least in part on the trajectory.

16. The autonomous vehicle of claim 15, wherein determining the decision point comprises determining the selected state from the set of candidate states based at least in part on where the stopping profile intersects with a linear representation of an estimated time of arrival of the autonomous vehicle at the interaction point.

17. The autonomous vehicle of claim 15, wherein the stopping profile is determined based at least in part on a maximum deceleration value and a maximum jerk value, wherein the maximum deceleration value is indicative of a maximum level of force applied to a braking actuator associated with the autonomous vehicle, and wherein the maximum jerk value is indicative of a maximum rate of change for achieving the maximum deceleration value.

18. The autonomous vehicle of claim 15, wherein the object data including the probability of interaction between the autonomous vehicle and the at least one object at the interaction point is determined from travel path data and prediction data, wherein the travel path data is descriptive of one or more predetermined potential paths for travel of the autonomous vehicle based at least in part on a common pattern of vehicle travel along one or more lanes of a roadway, and wherein the prediction data is descriptive of one or more predicted future locations for identified objects proximate to the autonomous vehicle.

* * * * *